Figure 1:
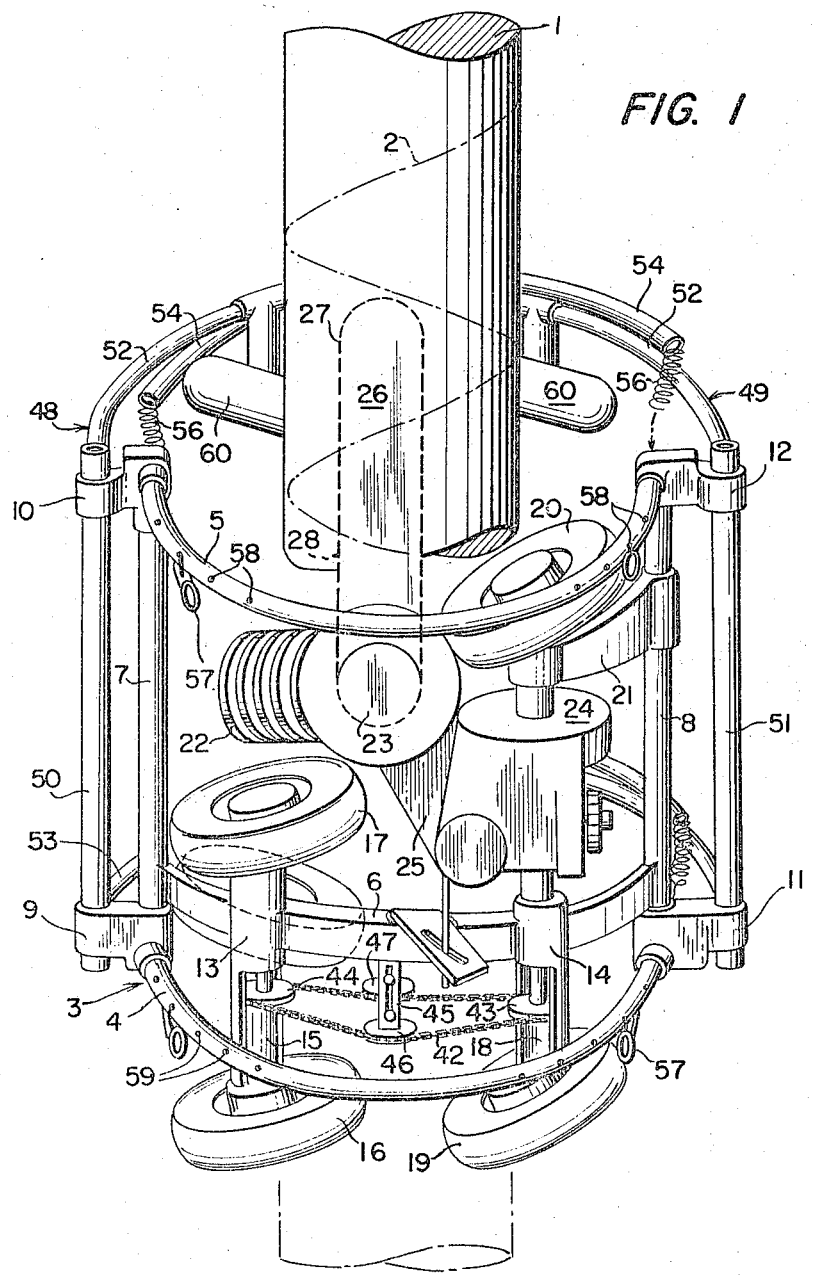

April 25, 1967 P. MEIER 3,315,714
CLIMBING MACHINES ADAPTED TO CUT OFF THE
BRANCHES OF STANDING TREES
Filed Nov. 25, 1964 2 Sheets-Sheet 1

INVENTOR.
PAUL MEIER
BY
Wenderoth, Lind & Ponack
ATTORNEYS

April 25, 1967 P. MEIER 3,315,714
CLIMBING MACHINES ADAPTED TO CUT OFF THE
BRANCHES OF STANDING TREES
Filed Nov. 25, 1964 2 Sheets-Sheet 2
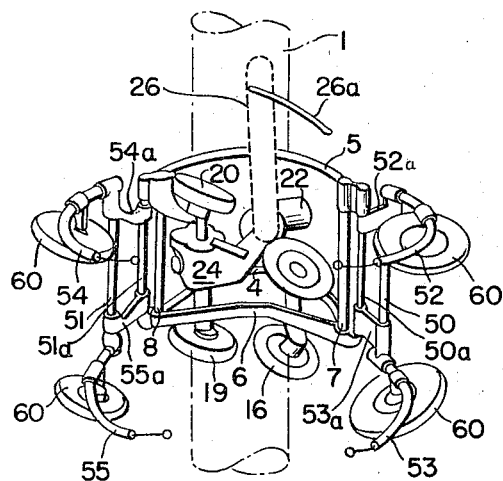
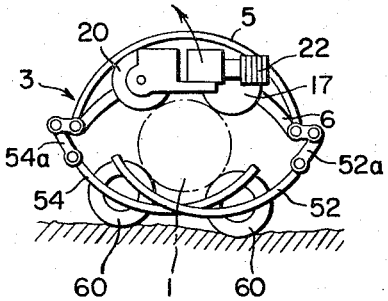
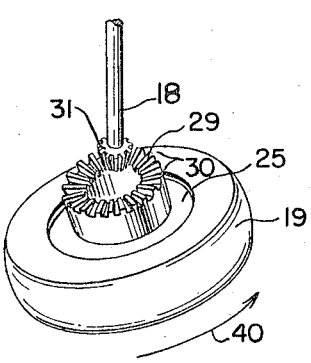
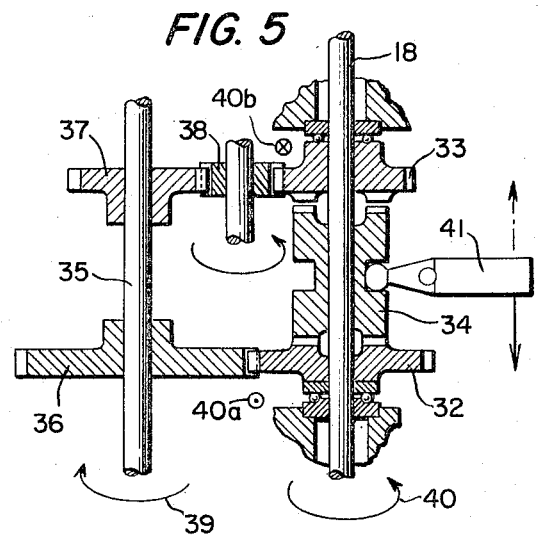
INVENTOR.
PAUL MEIER
BY
Wenderoth, Lind & Ponack
ATTORNEYS United States Patent Office 3,315,714
Patented Apr. 25, 1967

3,315,714
CLIMBING MACHINES ADAPTED TO CUT OFF
THE BRANCHES OF STANDING TREES
Paul Meier, Munchenstein, Switzerland, assignor to
Hans Heid, Basel, Switzerland
Filed Nov. 25, 1964, Ser. No. 413,923
14 Claims. (Cl. 143—32)

My invention has for its object a machine for climbing and removing branches of standing trees. Nowadays it is considered as essential to remove the branches of forest trees and in particular of needle-carrying trees with a view to obtaining a grade of wood without any branches.

Taking into account the lack of hands, it is not possible to execute such a work without any machinery. Also the use of long saws or of blade saws which must be raised along the tree trunks by means of cables and actuated by hand, has not led to any sufficient economy as to labor. Furthermore, the removal of branches with such auxiliary means leads readily to accidents.

Taking into account the rentability of forest economy, it has been endeavored since a long time to cut off the branches through machines and to this end, various machines have been already proposed.

The machines of this type which have been thus proposed are not always fit for all purposes and one of them can only be used for palm trees or else the cutting means or the means for holding the machine in contact with the tree are very likely to lead to damage since the machines can cling readily to the tree or else drop off the tree trunk. Such machines are also often large enough to engage the branches of the neighboring trees or are prevented from operating by the branches of such neighboring trees. Another machine of a known type is so heavy that it requires several men to control it and furthermore it cannot be reliably secured to a tree.

My invention for the first time provides a machine for removing the branches of trees, which satisfies the following conditions:

(1) The machine is of a comparatively light weight,
(2) It can be laid conveniently round a tree by a single man and similarly it can be removed by a single man off the tree,
(3) It is secured reliably to the tree,
(4) It can be suspended to the tree in a manner such that it is not prevented from operation by the neighboring trees and their branches and it cannot become entangled with the latter,
(5) It requires no chains for securing it to the tree, which chains might break and therefore lead to a crash of the machine,
(6) It is not provided with securing means which might damage the bark of the tree,
(7) It includes a carrier frame which, taking into account the round peripheral shape of the tree, is incurved at least on its side facing the tree so that the machine may be fitted round the tree,
(8) It is bestowed with a good and uniform rise along the tree trunk,
(9) It is provided with rollers in a manner such that these surround the tree engaged by them in an equilibrated manner,
(10) The machine is provided with securing arms which engage after the manner of human arms, both sides of the tree trunk and secure yieldingly the machine to the tree,
(11) It is provided with securing arms which surround the tree in the same manner as human arms so as to fasten the machine with reference to the tree trunk while said arms may be released after the manner of human arms and be shifted away from the tree to disconnect the machine with reference to the latter,
(12) The securing arms rest on the tree through the agency of rollers,
(13) An endless saw forming the cutting means is adapted to remove the branches and said saw is accurately guided in its operative plane,
(14) The endless saw is held in a manner such that the branch to be removed is sawn laterally instead of from above or from below,
(15) The endless saw is held yieldingly during the upward climbing of the machine along the tree in a position such that it saws the branches in the immediate proximity of the trunk,
(16) The endless saw is held away from the tree during the downward movement of the machine so that the latter cannot remain suspended to the stump of a branch,
(17) A reversing gear is associated with an arrangement through which the level up to which the machine is to climb is adjusted while, after reaching the desired height, said reversing gear reverses the drive so that the machine returns automatically down to the foot of the tree,
(18) The machine includes securing arms with wheels arranged in a manner such that the machine, when shifted away from the tree is laid through these carrier wheels on the ground and can be drawn through a coupling rod when the securing arms have been set in a position similar to that obtained when extending round the tree trunk.

My improved climbing machine for the removal of the branches of standing trees comprises a carrier frame and a control system supported by said frame and including a motor adapted to drive a sawing system including a saw, associated with a reversing gear and a set of rollers adapted upon setting of the climbing machine against a tree to be urged against the tree trunk along different directions and upon operation of the machine to execute a rolling movement over the tree trunk along parallel helical lines, while at least two of said rollers form climbing rollers adapted to be driven by the reversing gear so as to act as climbing rollers and to move the climbing machine along the helical lines along the tree trunk upwardly or downwardly as required.

My improved climbing machine is characterized by the fact that the reversing gear is provided with an output shaft through which the climbing rollers are driven while the rollers or at least the climbing rollers are secured to the carrier frame in a manner such that at any moment the medial plane of the roller which is perpendicular to the rotary axis of a climbing roller passes through the tangent to the helical line defining the rolling movement for the corresponding climbing roller at the medial contacting point between said climbing roller and the helical line and furthermore the driving motor, the sawing system and reversing gear form a unit which is arranged so as to rock round the output shaft in a manner such that upon rocking of the rockable unit in one direction, the saw is shifted in a direction which lays it in its operative position along the tree trunk of which the branches are to be cut off and, upon rocking of the rockable unit in the opposite direction, the saw is moved away from the tree trunk up to a predetermined distance from the latter.

I will now describe an embodiment of my improved climbing machine for the removal of the branches of standing trees, reference being had to the accompanying drawings wherein:

FIG. 1 is a perspective view of my improved climbing machine, said view showing the motor as seen somewhat from above, FIG. 2 is a perspective view of a modification of the climbing machine according to FIG. 1, showing the open securing arms also seen somewhat from above, FIG. 3 is a plan view of the climbing machine according to FIG. 1 when engaging a tree, FIG. 4 is a perspective view of the gear including an inner bevel wheel adapted to drive a climbing roller, FIG. 5 illustrates diagrammatically the reversing gear and the operative mechanism for the rocking of the rocking of the rockable unit which may be shifted automatically as required for the drive in the upward and downward directions.

Turning to FIG. 1 illustrating in perspective view the climbing machine to be described hereinafter and which serves for removing the branches of standing trees, said machine in its operative position engages the tree 1 of which the branches are to be cut off. The helical line 2 along which the machine is to move upwardly and downwardly round the tree is shown in dot and dash lines on said tree. The machine includes a carrier frame provided with a lower incurved tube 4, an upper incurved tube 5, an arcuate support 6 and stays 7 and 8 with carrier heads 9 and 10 on the stays 7 and further carrier heads 11 and 12 on the other stay 8. The lower incurved tube 4 and the upper incurved tube 5 are parallel and the stays 7 and 8 are also parallel. The arcuate support 6 fitted between the carrier heads 9 and 11 has a larger radius of curvature than the tubes 4 and 5.

As illustrated in FIG. 1, the stays 7 and 8 are substantially parallel to the vertical axis of the tree while the incurved tubes 4 and 8 surround the tree trunk. Also the flatter arcuate support 6 is arranged in a manner such that its concavity or inner curve faces the tree trunk. Thus, the carrier frame engages to a certain extent the periphery of the tree trunk 1.

Supposing that the stay 7 is subjected to a translational movement along the tubes 4 and 5 up to the location of the stay 8 and then to a further translational movement along the arcuate support 6 back into its starting position, in such a case the stay 7 has moved over a front surface and a rear surface defining between them a space which may be termed the inner operative space inside the frame 3 and has a horizontal cross-section somewhat in the shape of a crescent.

In FIG. 1 are shown inside said inner space two uprights 13 and 14 secured to the arcuate support and projecting both downwardly beyond said inner space. The upright 13 carries the bearings for a shaft 15 and for two climbing rollers 16 and 17 while the other upright 14 carries the bearings for one half of a shaft 18 and for a further climbing roller 19. The other half of the shaft 18 and the climbing roller 20 are carried inside a carrier arm 21. The climbing rollers 16 and 19 are arranged outside the inner space. The climbing rollers 17 and 20 lie for the major part of their bulk inside said space and project through a minor section into the interval between said inner space and the tree so as to engage the latter.

The part played by the climbing rollers 16, 17, 19 and 20 consists in engaging the tree trunk 1 so as to execute along its outer surface a rolling movement along helical lines which are parallel or coincide with the helical lines 2.

The shaft 18 carries a rockable unit including the following element; an internal combustion engine 22, a sawing system 23, a reversing gear 24 and connecting members 25 between the latter. The rockable unit lies inside the inner space of the carrier frame but it can rock round the shaft 18 in a manner such that it projects into the interval between the tree and the inner space. Said unit can rock in the opposite direction only until certain parts thereof, and in particular the upwardly directed saw guard 26 and endless saw 2 impinge against the incurved tube 5.

Upon rocking of said unit in the direction leading it towards the tree trunk 1, the sawing system 23 engages the tree trunk in a manner such that its casing 26 carrying the sawing chain 27 engages the tree trunk 1.

The structure of the climbing machine according to FIG. 1 is such that the stays 7 and 8, the shafts 17 and 18 and the side 28 of the endless saw 27 lying to the front when the climbing machine moves upwardly along the tree, are parallel with one another. When the climbing machine is properly secured to a tree, the side 28 of the endless saw 27 should be somewhat parallel to the axial line of the tree or at least approximately so and engage the outer surface of the tree trunk along such a line parallel or substantially parallel to said axial line of the tree. This ensures that a stump branch, left by the saw upon cutting of a branch, is as short as possible and lies symmetrically to the outer surface of the tree. The height of such a stump branch, that is the distance thereof from the periphery of the tree depends on how near the tree trunk the front edge of the saw casing lying adjacent the side 28 may be guided during the sawing of the branch.

The internal combustion engine 22 drives the sawing system 23 and simultaneously it drives the reversing gear 24 which includes the shaft 18 forming its output shaft. Said shaft 18 may be driven by the motor 22 in either direction through the agency of said reversing gear.

When the climbing machine, illustrated in FIG. 1, is to move upwardly of the tree along the helical line 2, the climbing rollers 16, 17, 19 and 20 must revolve in the direction illustrated by an arrow in the drawings. The climbing rollers are driven by the shafts 15 and 18 through a gear including an inner bevel wheel as illustrated for the operative connection between the shaft 18 and the climbing roller 19 in FIG. 4.

As illustrated in FIG. 4, the climbing roller 19 carries along its inner periphery a wheel 25 provided with an inner series of bevel teeth arranged symmetrically with reference to the rotary axis. The shape of the bevel wheel 29 is cylindrical in the case of FIG. 4. It may also be formed as a spherical cap with a conical bore in which are arranged the conically extending teeth. The teeth of the inner wheel mesh with a bevel wheel 31 rigid with the shaft 18.

The shaft 18 carries, as illustrated in FIG. 5, a toothed wheel 32, a coupling member 33 and a toothed wheel 34. The two toothed wheels are freely revolvable on said shaft 18 and may be coupled with said shaft through the coupling member 33 adapted to slide longitudinally on the shaft 18, but revolving in unison with the latter.

FIG. 5 shows a shaft 35 parallel with the shaft 18 and rigidly carrying two toothed wheels 36 and 37. The shaft 35 is driven through means which are not illustrated by the motor 22 and revolves in the direction of the arrow 39.

The toothed wheel 37 engages the intermediate wheel 38 which transmits its peripheral movement to the toothed wheel 33. The toothed wheel 36 engages the toothed wheel 32 and the toothed wheel 33 runs consequently in a direction opposed to that of the rotation of the toothed wheel 32. By coupling the shaft 18 through the coupling member 34 with the toothed wheel 33 or 32, there is obtained a rotation in a corresponding direction of the shaft 18. To the direction of rotation illustrated by the arrow 39 there corresponds, when the shaft 18 is coupled through the toothed wheel 32, the rotary direction illustrated by the arrow 40 for the shaft 18 which corresponds to the same direction of rotation 40 for the roller 19 illustrated in FIG. 4.

Since the rockable unit is freely revolvable round the shaft 18, the operation of said unit should now be considered, which operation is obtained upon reversal of the direction of rotation of the output shaft 18 of the reversing gear 24. FIG. 5 allows understanding the procedure to be considered.

Upon driving of the shaft 18 through the toothed wheel 32 and the toothed wheel 36, said shaft 18 revolves in the direction of the arrow 40 and the climbing roller 19 rotates in the direction of the arrow 40. The driving force exerted by the toothed wheel 36 on the toothed wheel 32 is performed in such a case in the medial working direction illustrated by the point of the arrow 40a. The reaction, corresponding to said driving force and opposed to the latter, acts through the toothed wheel 36 on the rockable unit in a manner such that the latter rocks round the shaft 18 towards the tree trunk 1 (FIG. 1).

On the contrary, the drive of the shaft 18 through the toothed wheel 33 and the toothed wheels 38 and 37 causes the latter to drive the shaft 18 together with the climbing roller 19 in a direction opposed to the direction of the arrow 40. The driving force exerted by the toothed wheel 38 on the toothed wheel 33 operates then in the medial operative direction given out by the end of the arrow as shown at 40b. The reaction corresponding to the driving force and opposed to the latter operates through the toothed wheel 38 on the rockable unit in a manner such that the latter is urged round the shaft 18 away from the tree trunk 1 as illustrated in FIG. 1.

The shaft 18 which is thus driven in either direction controls, in addition to the driving rollers 15, the shaft 15 which is parallel to said shaft 18. The operative connection between the two shafts is illustrated in FIG. 1 as constituted by a driving chain 42 which receives its driving power from a chain wheel 43 keyed to the shaft 18 so as to transmit it to the chain wheel 44 keyed to the shaft 15. In order that the chain 42 may always be suitably tensioned, there are provided two chain-tensioning wheels 46 and 47 fitted on a slotted carrier strap 45 and said tensioning wheels are secured by screws to said carrier strap 45 while they may be adjusted after loosening of the screws at the desired points of the slot in said carrier strap.

Up to now, I have only described the parts of the climbing machine including chiefly the carrier frame 3, the shafts 15 and 18, the climbing rollers 16, 17, 19 and 20 and the rockable unit. The section of the climbing machine thus described forms the front section of the machine illustrated in FIG. 1 and secured to the front of the tree trunk 1. In order to secure said front section to the tree trunk, it is necessary furthermore to resort to a few parts which have not been described hitherto and which engage the tree trunk as if they formed the arms of the climbing machine.

As illustrated in FIG. 1, the pairs of carrier heads 9–10 and 11–12 carry the corresponding securing arms 48 and 49. Each of these two securing arms includes a vertical rectilinear tubular member, 50 or 51 respectively, through which the securing arm is held inside the carrier heads 9 and 10 or 11 and 12, as the case may be. The rectilinear tubular member of each securing arm is connected at its upper and lower ends with the corresponding incurved arm sections 52–53 for the arm 48 or 54 and 55 for the arm 49. As illustrated in FIG. 1, the upper incurved arm sections 52 and 54 are hollow and inside each of the arm sections 52 and 54 is inserted a coil spring 56 secured thereto and the free end of which projects beyond the outer end of the arm sections out of the hollow part thereof so as to serve to tension said arm section upon application of the machine against the tree trunk through engagement of the spring on the part of the carrier frame adjacent the free end of the section. Each spring 56 carries for this purpose at its free end a hook 57 while the frame tube 5 is provided with openings 58 for selective engagement by said hooks.

The lower arm sections 53 and 55 are also provided with an inner hollow recess inside which are fitted helical coil springs terminating with hooks. The tube 4 is provided also with openings 59 for engagement by the hooks on the lower arm sections.

As illustrated in FIGS. 1 to 3, each of the arm sections 52, 53, 54, 55 on the carrier arms 48, 49 is provided with a carrier or idle roller 60.

These idle rollers are secured to the arm sections in a manner such that, upon application of the arm sections round the tree trunk, said idle rollers engage the tree trunk in a manner such that they progress in the same manner as the climbing rollers upwardly or downwardly of the tree along the helical line 2 or along a parallel helical line.

The fact that, upon erection of the front section of the climbing machine, the arm sections 52–53 and 54–55 surround the tree trunk and may be secured at their free ends by the hooks engaging tensioning springs, all the rollers of the climbing machine are urged against the tree trunk. At the same time, the four climbing rollers 16, 17, 19 and 20 which are fitted on the carrier frame 3 are urged against the front of the tree trunk while the four idle rollers 60 carried by the arm sections are urged against the rear surface of the tree trunk. The rollers being thus urged from opposite sides against the tree, the climbing machine is securely held with reference to the tree. The machine can furthermore be shifted upwardly and downwardly by the suitably adjusted rollers along a helical path upwardly and downwardly of the tree trunk. In brief the rollers, through which the drive is obtained, operate in a manner such that the machine may climb automatically upwardly along the tree or run downwardly along said tree.

In order that the climbing machine, which climbs helically along the tree trunk, may be returned to the foot of the tree, it is provided in the usual manner with a reversing gear. To allow controlling by hand the reversing of the gear between upward and downward movement, it would be necessary to provide a control or pulling cable suspended between the climbing machine and the foot of the tree. Since however such an auxiliary is unreliable, particularly in a forest, and by reason of the falling sawn off branches, there is provided on the climbing machine an arrangement which executes automatically the reversal of the reversing gear. Said arrangement which is known per se, is adjusted before the beginning of the rising movement of the climbing machine along the tree trunk for a predetermined length of travel. The travelling length over which the climbing machine moves, is measured by a measuring instrument driven by a rotary section of the motor shaft, of the driving gear or of one of the driving shafts 15 or 18, said instrument being reversed after reaching the previously adjusted length of travel under the action of said driving means with or without the aid of the auxiliary force exerted by a spring or the like so as to reverse the machine from tree upward to tree downward movement.

This automatic reversal is of a further importance from another standpoint. In particular, if the climbing machine has not reached the predetermined level along the tree trunk to be considered, for instance because the saw has become jammed in contact with a branch, in such a case, the drive of the climbing machine continues moving in an idle manner. Thus the measuring instrument ensuring the reversal of the reversing gear reaches the value of the length of travel for which it has been adjusted and the drive is reversed. Thus, the climbing machine is driven in the opposite direction, is released normally from the hindrance to which it was subjected and returns automatically to the foot of the tree.

FIGS. 2 and 3 illustrate an embodiment of the climbing machine which shows a few small modifications with reference to the machine, described hereinabove with reference to FIG. 1.

In FIG. 2, the embodiment is designed in a manner such that the climbing machine is shown from the rear, that is from the side corresponding to its securing arms. The tree trunk 1 which is illustrated in dot-and-dash lines in FIG. 2 would actually conceal the saw and the entire rockable unit.

FIG. 2 shows the securing arms in their open condition.

As in the case of FIG. 1, the two securing arms 48 and 49 are revolvably carried in the pairs of carrier heads 9–10, and 11–12. As illustrated in FIG. 2, there are provided auxiliary vertical tubes 50a and 51a in the pairs of carrier heads, which tubes carry adjustable connections 52a, 53a, 54a and 55a screwed over said tubes and the ends of which remote from the tubes 50a and 51a are fitted over the securing arms 48 and 49.

FIG. 3 illustrates in plan view the climbing machine according to FIG. 2, which machine is fitted on a tree trunk. Said FIG. 3 shows clearly how much the above-described climbing machine engages in intimate contacting relationship to the tree trunk the branches of which are to be cut off.

Assuming the tree trunk 1 illustrated in FIG. 3 is removed, the securing arms 48 and 49 with the arm sections 52, 53, 54 and 55 may be folded back nearer the carrier frame 3. If it is also assumed, as illustrated in FIG. 3, that the climbing machine is set on the ground through its rollers 60, the climbing machine can be then caused to progress over the carrier rollers after the manner of a vehicle on its own wheels along roads and streets.

The wheels show, with reference to the longitudinal medial line of the climbing machine which is to be considered as coinciding with the axial line of the tree trunk, a certain obliquity. The transportation of the climbing machine through the carrier wheels on a street or road is by no means hindered thereby. There is provided for the climbing machine a connecting bar engaging an opening provided therefor and extending in a plane parallel to the planes in which the carrier wheels run so that it is thus possible to conveniently draw or push the climbing machine, even in forest lanes.

The carrier frame, the securing arms and also the vertical tubes shown in FIG. 2 between the carrier frame and the securing arms can be constituted by light aluminium tubes. Similarly, the carrier heads and the connections in which the ends of the securing arms are fitted as shown in FIG. 2, may be made of aluminium. Such a structure leads to a climbing machine of a very reduced weight so that it may be used also for comparatively thin trees.

The comparatively reduced weight of the climbing machine and its compact structure, allow its handling by a single man who can thus set it in contact with a tree trunk or remove it from such a tree trunk.

In the above-described climbing machine, there are provided four climbing rollers driven by two shafts 15 and 18. The drive of the machine could be also designed in a manner such that only two climbing rollers are driven, for instance only the two rollers 19 and 20 carried by the shaft 18. Since the rollers of the climbing machine are urged from all sides against the trunk and taking into account the efficiency of the rollers when engaging the tree trunk, it is not necessary to make any difference between the front and rear wheels. Thus, it is possible to drive as required either pair of rollers. Also, it is not necessary for the rollers of the pair used for driving, to lie near each other in the longitudinal direction of the helical line. Also an arrangement wherein both climbing rollers run one in front of the other and in particular along the same helical line, is possible.

In the above description, the idle running rollers of the climbing machine are carried by the arm sections so as to roll over the tree trunk in the same manner as the climbing rollers and the design is such that said idle rollers may run longitudinally or in parallelism with the helical line 2 along the tree trunk. Instead of securing said idle rollers in direction, it is also possible to form such idle rollers as follower rollers which assume automatically the direction of progression of the climbing machine.

As concerns the springs which serve for holding fast the securing arms against the tree trunk, it should be mentioned that they should be sufficiently resistant for them to urge the rollers against the tree trunk with a pressure such that it protects the machine against slipping not only under the action of its own weight but also under the action of the weight of the branches of the tree, which when cut off, may abut against the frame of the machine or remain suspended on said frame.

Since the driving motor is liable to stop, the machine is designed in a manner such that, upon stopping of the motor, it is set under idling conditions and returns automatically through the action of gravity to the foot of the tree trunk. The idle return movement is obtained through the fact that the coupling member 34 of FIG. 5 is brought by a coupling lever 41 into its medial position for which the shaft 18 is no longer coupled either with the toothed wheel 32 or with the toothed wheel 33.

For setting the coupling lever 41 in its medial position, I resort to an arrangement which is not illustrated: on the input shaft 35 of the reversing gear, a propelling screw is carried by a shiftable sleeve, which screw projects the oil into the gear casing while it is urged by the reaction opposing the action of a tensioning spring into a predetermined position. Upon stopping of the shaft 35, the shiftable sleeve is drawn under the action of the tensioning spring into another position whereby a lever arm subjected to the action of a spring brings the coupling lever into its medial position.

The arrangement which has been described hereinabove is such that the outer periphery of the climbing machine engaging a tree is annularly shaped at its lower and upper ends. Thus, the climbing machine rising along the tree trunk lifts to a certain extent the downwardly dropping branches. The fact of surrounding the rocking unit of the machine by an incurved tube 5 protects the structure against injury by the cut off and falling branches and prevents these branches from being too easily caught by said unit.

What I claim is:

1. In a climbing machine adapted to cut off the branches of standing trees, including a carrier frame adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, connecting means driven by the power unit through the reversing gear and driving the rollers selectively in both direction of rotation to make the frame rise and sink helically along the tree engaged by it and means wherethrough the reversing gear, khen driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree.

2. In a climbing machine adapted to cut off the branches of standing trees, including a carrier frame, adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, a toothed wheel coaxially rigid with the output shaft of the reversing gear, an inwardly toothed wheel coaxially rigid with one roller and meshing with last-mentioned toothed wheel to make said roller rotate selectively under the action of the reversing gear in both directions of rotation, means whereby said one roller drives in a corresponding direction at least one other roller, the movement of said rollers being adapted to make the frame rise and sink with reference to the tree engaged by it and means wherethrough the reversing gear, when driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree.

3. In a climbing machine adapted to cut off the branches of standing trees including a carrier frame adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, connecting means through which the power unit drives at least two rollers through the reversing gear selectively in both directions of rotation to make the frame rise and sink with reference to the tree engaged by it means wherethrough the reversing gear, when driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree and means whereby the reversing gear upon failure of the power unit releases the driving means connecting it with the cooperating rollers to allow the rollers to run downwardly along the corresponding helical lines until the frame has sunk down to ground level.

4. In a climbing machine adapted to cut off the branches of standing trees including a carrier frame adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, said axis of the output shaft being parallel with the location of the line defining the periphery of the tree to be engaged by the frame in a plane passing through the central axes of said tree and of the output shaft, connecting means through which the power unit drives at least two rollers through the reversing gear selectively in both directions of rotation to make the frame rise and sink with reference to the tree engaged by it and means wherethrough the reversing gear, when driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree.

5. In a climbing machine adapted to cut off the branches of standing trees including a carrier frame adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, said axis of the output shaft being parallel with the location of the line defining the periphery of the tree to be engaged by the frame in a plane passing through the central axes of said tree and of the output shaft, connecting means through which the power unit drives at least two rollers through the reversing gear selectively in both directions of rotation to make the frame rise and sink with reference to the tree engaged by it, means wherethrough the reversing gear, when driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree and a guiding member for the sawing device carried by the latter with its narrow edge lying to the front during the rising movement of the frame extending in substantial parallelism with the axis of the output shaft of the reversing gear.

6. In a climbing machine adapted to cut off the branches of standing trees, including a carrier frame adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, connecting means through which the power unit drives at least two rollers through the reversing gear selectively in both directions of rotation to make the frame rise and sink helically along the tree engaged by it, the reaction of said connecting means on the rockable means constituted by the power unit, the sawing device and the reversing gear being adapted during upward movement, to urge said rockable means into one angular position corresponding to operation of the sawing device and during downward movement to urge said rockable parts into the other angular position for which the sawing device is inoperative and lies at a distance from the tree engaged by the frame.

7. In a climbing machine adapted to cut off the branches of standing trees, including a carrier frame, adapted to engage a tree, a power unit, a sawing device driven by the power unit and a reversing gear driven by the power unit and provided with an output shaft, the provision of a plurality of rollers carried by the frame in annularly distributed positions extending round the tree to be engaged by the frame, means carried by the frame urging the rollers against the tree engaged by said frame, bearings on the frame for the output shaft of the reversing gear, the power unit, sawing device and reversing gear being adapted to rock round the axis of the output shaft of the reversing gear between two angular positions with reference to the frame, a bevelled toothed wheel coaxially rigid with the output shaft of the reversing gear, an inwardly toothed wheel coaxially rigid with one roller and meshing with last-mentioned toothed wheel to make said roller rotate selectively under the action of the reversing gear in both directions of rotation, at least one auxiliary shaft driven by said one roller, a bevelled toothed wheel coaxially rigid with the auxiliary shaft, an inwardly toothed wheel coaxially rigid with another roller and meshing with last-mentioned toothed wheel to make said other roller rotate in the same direction as said one roller, the movement of said rollers being adapted to make the frame rise and sink with reference to the tree engaged by it and means wherethrough the reversing gear, when driving the rollers in a direction corresponding to upward movement, urges the support and therewith the sawing device into one of said angular positions adjacent the tree engaged by the frame and, when driving the rollers in a direction corresponding to downward movement, urges the support and therewith the sawing device into the other angular position away from said tree.

8. A climbing machine adapted to cut off the branches of an unfelled tree by climbing along the latter, comprising a frame including two vertical stays, two arcuate tubes rigidly interconnecting the upper and lower ends of the stays respectively, and a flatter arcuate member connected across the two stays above the lower arcuate tube, a shaft revolvably carried by said arcuate member in parallelism with the stays, an arrangement revolvably carried by said shaft and including a power unit, a sawing device controlled by the power unit and a reversing gear operatively connecting the power unit with the shaft, said arrangement being shiftable between an inoperative position for which the sawing device lies at a distance from a tree engaged by the frame and an operative position for which the sawing device engages said tree, and means controlled by the power unit and driving the frame alongside said tree.

9. A climbing machine adapted to cut off the branches of an unfelled tree by climbing along the latter, comprising a frame having a round outline when seen from above to intimately engage the periphery of a tree trunk and including two vertical stays, two arcuate tubes rigidly interconnecting the upper and lower ends of the stays respectively, and a flatter arcuate member connected across the two stays above the lower arcuate tube, a shaft revolvably carried by said arcuate member in parallelism with the stays, an arrangement revolvably carried by said shaft and including a power unit, a sawing device controlled by the latter and a reversing gear operatively connecting the power unit with the shaft, said arrangement being shiftable between an inoperative position for which the sawing device lies at a distance from the trunk engaged by the frame and an operative position for which the sawing device engages said tree, and means controlled by the power unit and driving the frame alongside said tree.

10. A climbing machine adapted to cut off the branches of an unfelled tree by climbing along the latter, comprising a light easily portable frame including two vertical stays, two arcuate tubes rigidly interconnecting the upper and lower ends of the stays respectively, and a flatter arcuate member connected across the two stays above the lower arcuate tube, a shaft revolvably carried by said arcuate member in parallelism with the stays, an arrangement revolvably carried by said shaft and including a power unit, a sawing device controlled by the power unit, and a reversing gear operatively connecting the power unit with the shaft, said arrangement being shiftable between and inoperative position for which the sawing device lies at a distance from a tree engaged by the frame and an operative position for which the sawing device engages said tree, and means controlled by the power unit and driving the frame alongside said tree.

11. A climbing machine adapted to cut off the branches of an unfelled tree by climbing along the latter, comprising a frame including two vertical stays, to arcuate tubes adapted to engage one side of a tree trunk and rigidly interconnecting the upper and lower ends of the stays respectively, a flatter arcuate member connected across the two stays above the lower arcuate tube and securing arms pivotally secured to said arcuate tubes and adapted to be angularly shifted between an outer inoperative position and an operative position engaging the side of the tree trunk opposed to that engaged by the arcuate tubes, a shaft revolvably carried by said arcuate member in parallelism with the stays, an arrangement revolvably carried by said shaft and including a power unit, a sawing device controlled by the power unit and a reversing gear operatively connecting the power unit with the shaft, said arrangement being shiftable between an inoperative position for which the sawing device lies at a distance from a tree engaged by the frame and an operative position for which the sawing device engages said tree, and means controlled by the power unit and driving the frame alongside said tree.

12. A climbing machine adapted to cut off the branches of an unfelled tree by climbing along the latter, comprising a frame including two vertical stays, two arcuate tubes adapted to engage one side of a tree trunk and rigidly interconnecting the upper and lower ends of the stays respectively, a flatter arcuate member connected across the two stays above the lower arcuate tube and securing arms pivotally secured to said arcuate tubes and adapted to be angularly shifted between and outer inoperative position and an operative position engaging the side of the tree trunk opposed to that engaged by the arcuate tubes, means urging elastically said securing arms towards their operative position, carrier rollers revolvably carried by said securing arms and adapted to engage the tree trunk, a shaft revolvably carried by said arcuate member in parallelism with the stays, an arrangement revolvably carried by said shaft and including a power unit, a sawing device controlled by the latter and a reversing gear operatively connecting the power unit with the shaft, said arrangement being shiftable between an inoperative position for which the sawing device lies at a distance from a tree engaged by the frame and an operative position for which the sawing device engages said tree, and climbing rollers controlled by the power unit revolvably carried by the power unit and adapted to helically move along said tree trunk.

13. A climbing machine adapted to cut off the branches of an unfelled tree by climbing along the latter, comprising a frame including two vertical stays, two arcuate tubes adapted to engage one side of a tree trunk and rigidly interconnecting the upper and lower ends of the stays respectively, a flatter arcuate member connected across the two stays above the lower arcuate tube and securing means pivotally secured to said arcuate tubes and adapted to be angularly shifted between an outer inoperative position and an operative position engaging the side of the tree trunk opposed to that engaged by the arcuate tubes, means elastically urging said securing arms towards their operative position, carrier rollers revolvably carried by said securing arms and adapted to engage the tree trunk, and to be shifted angularly round said arms to run over ground when the securing arms are in their operative position and the frame is tilted sideways with its stays extending horizontally, a shaft revolvably carried by said arcuate member in parallelism with the stays an arrangement revolvably carried by said shaft and including a power unit, a sawing device controlled by the latter and a reversing gear operatively connecting the power unit with the shaft, said arrangement being shiftable between an inoperative position for which the sawing device lies at a distance from a tree engaged by the frame and an operative position for which the sawing device engages said tree and climbing rollers controlled by the power unit, revolvably carried by the power unit and adapted to helically move along said tree trunk.

14. A climbing machine adapted to cut off the branches of an unfelled tree by climbing along the latter, comprising a frame including two vertical stays, two arcuate tubes adapted to engage one side of a tree trunk and rigidly interconnecting the upper and lower ends of the stays respectively, a flatter arcuate member connected across the two stays above the lower arcuate tube and securing arms pivotally secured to said arcuate tubes and adapted to be angularly shifted between an outer inoperative position and an operative position engaging the side of the tree trunk opposed to that engaged by the arcuate tubes, means urging elastically said securing arms towards their operative position, carrier rollers revolvably carried by said securing arms and adapted to engage the tree trunk and to roll along helical lines over the latter, a shaft revolvably carried by said arcuate member in parallelism with the stay, an arrangement revolvably carried by said shaft and including a power unit, a sawing device controlled by the latter and a reversing gear operatively connecting the power unit with the shaft, said arrangement being shiftable between an inoperative position for which the sawing device lies at a distance from a tree engaged by the frame and an operative position for which the sawing device engages said tree, and climbing rollers controlled by the power unit, revolvably carried by the power unit and adapted to move along said tree trunk, along helical lines having the same pitch as the above-mentioned helical lines.

References Cited by the Examiner

UNITED STATES PATENTS

| | | |
|---|---|---|
| 2,477,922 | 8/1949 | Emery et al. |
| 2,482,392 | 9/1949 | Whitaker. |
| 3,030,986 | 4/1962 | Longert. |

FOREIGN PATENTS

| | | |
|---|---|---|
| 836,716 | 4/1952 | Germany. |
| 927,661 | 5/1955 | Germany. |

WILLIAM W. DYER, JR., *Primary Examiner.*

W. D. BRAY, *Assistant Examiner.*